(No Model.)

C. T. REMUS.
JOINT FOR STRAPS.

No. 400,872. Patented Apr. 2, 1889.

Witnesses.
D. A. Gourick.
Lort Phillips.

Inventor,
CARL TEODOR REMUS,
By his Attorney

UNITED STATES PATENT OFFICE.

CARL TEODOR REMUS, OF DRESDEN, SAXONY, GERMANY, ASSIGNOR TO JEAN SCHERBEL, OF SAME PLACE.

JOINT FOR STRAPS.

SPECIFICATION forming part of Letters Patent No. 400,872, dated April 2, 1889.

Application filed July 31, 1888. Serial No. 281,603. (No model.)

*To all whom it may concern:*

Be it known that I, CARL TEODOR REMUS, residing at Dresden, in the Kingdom of Saxony and German Empire, have invented an Improved Joint for Straps, of which the following is a specification.

This invention relates to improvements in belt or strap fasteners, and is designed to effect a joint or connection between the ends of a driving-belt in such a manner that no parts of the connection project over the surface of the belt; that the belt shall be as flexible at the connecting part as at any other parts; that the material shall not be lessened or weakened at the joint, and that the connection may be effected easily without previously perforating the belt and disconnected without much trouble.

In order that my invention may be the better understood, I now proceed to describe the same, reference being had to the accompanying sheet of drawings.

Figure 1:
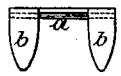
Figure 2:
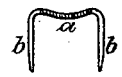
Figure 3:
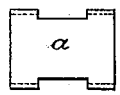
Figure 4:
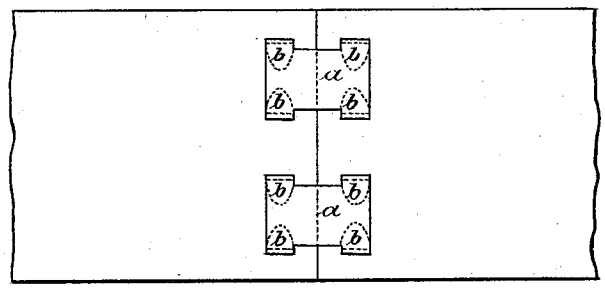
Figure 5:
Figure 6:

Figure 1 is an elevation, Fig. 2 a section, and Fig. 3 a plan, of this belt or strap fastener. Fig. 4 is a view of a joint effected by means of this fastener. Fig. 5 represents two sections of the fastener while the joint is being effected, and Fig. 6 is a sectional view of the joint when effected.

As shown in Figs. 1, 2, and 3, the belt-fastener consists of a cramp of sheet metal in the form of a strip, $a$, slightly curved across its longitudinal axis, on the corners of which are four teeth, $b$, with sharp points and slightly-curved edges, and which are bent so that they are nearly rectangular to the middle part, $a$, of the cramp. The teeth are of such a width and so located that they leave a space between each pair wider than themselves. The cramp is preferably made of sheet-steel of good quality. The cramp is placed upon the ends of the belt butted against each other, so that its longitudinal axis is parallel to the belt and that the teeth are in the same direction as the belt, as illustrated in Fig. 4, which shows the joint when effected. The cramp is fixed by driving into the belt by pressure or blow. The teeth $b$ penetrate the belt, their edges cutting into the leather, until the center of the curved part $a$ lies against the belt. (See Fig. 5, left side.) Then by the effect of the blow this curved part is straightened until it lies flat against the belt, while the teeth farther penetrate the belt and slightly approach one another. (See Fig. 5, right side.) The attachment of the cramp is then completed by the bending over of the points of the teeth $b$, protruding through the belt, by hammering or suitable pressure. This is effected so that the points of the teeth are turned toward each other. The surfaces and points of the cramp press themselves somewhat into the belt, so that the parts of the cramp do not, or only slightly, protrude over the surface of the belt. According to the width of the belt, two or more cramps are used for one joint. The power of resistance of this connection against the longitudinal pulling strain is produced especially by the strong friction which the surfaces of the cramp exert upon the material inclosed by them. As the teeth $b$ penetrate the belt in its longitudinal direction, the latter is only weakened very slightly in this direction, according to the thickness of the sheet metal from which the cramp is made. In consequence of the width of the space between the teeth $b$ there is sufficient material between the latter and the edges of the belt to secure efficient power of resistance of the belt also at this part.

In order to unfasten the connection, the bent points of the teeth are bent back again, when the cramp may be easily withdrawn.

Having now particularly described and ascertained the nature of my said invention and in what manner the same is to be performed, I declare that what I claim is—

A belt or strap fastener consisting of a cramp of sheet metal in the shape of a slightly-downward curved sheet-metal strip, $a$, with four sharp-pointed teeth, $b$, at the corners, a wide space being left between the two teeth on each side, substantially as and for the purpose specified.

In testimony whereof I have signed my name to this specification in the presence of two subscribing witnesses.

CARL TEODOR REMUS.

Witnesses:
PAUL DRUCKMÜLLER,
EMIL DOMSCH.